(12) United States Patent
Muendel et al.

(10) Patent No.: US 10,228,607 B2
(45) Date of Patent: Mar. 12, 2019

(54) SECOND HARMONIC GENERATION

(71) Applicant: Lumentum Operations LLC, Milpitas, CA (US)

(72) Inventors: Martin H. Muendel, Oakland, CA (US); James J. Morehead, Milpitas, CA (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 15/716,159

(22) Filed: Sep. 26, 2017

(65) Prior Publication Data

US 2018/0017841 A1 Jan. 18, 2018

Related U.S. Application Data (63) Continuation-in-part of application No. 15/429,804, filed on Feb. 10, 2017, which is a continuation of
(Continued)

(51) Int. Cl.
*G02F 1/37* (2006.01)
*G02F 1/35* (2006.01)
(Continued)

(52) U.S. Cl.
CPC .............. *G02F 1/37* (2013.01); *G02F 1/3501* (2013.01); *G02F 1/353* (2013.01); *G02F 1/3551* (2013.01); *H01S 3/0092* (2013.01); *G02F 2001/3503* (2013.01); *G02F 2001/354* (2013.01); *G02F 2001/3505* (2013.01);
(Continued)

(58) Field of Classification Search
CPC ....................................................... G02F 1/37
See application file for complete search history.

(56) References Cited

U.S. PATENT DOCUMENTS 5,452,312 A 9/1995 Yamamoto et al.
5,592,326 A * 1/1997 Taira .................. G02F 1/37
359/326

(Continued)

FOREIGN PATENT DOCUMENTS

EP 2947509 11/2015
JP H03-145777 A 6/1991
(Continued)

OTHER PUBLICATIONS

M. H. van der Mooren., "Determination of type I phase matching angles and conversion efficiency in KTP", Applied Optics, vol. 34, No. 6, pp. 934-937, Feb. 20, 1995.*
(Continued)

*Primary Examiner* — Rhonda S Peace
(74) *Attorney, Agent, or Firm* — Harrity & Harrity, LLP (57) ABSTRACT

A second harmonic generator may include a combiner to combine a fundamental optical beam with a residual fundamental optical beam. The second harmonic generator may include a second harmonic crystal, coupled to the combiner, to generate a second harmonic optical beam from the fundamental optical beam and the residual fundamental optical beam. Upon generation of the second harmonic optical beam, the residual fundamental optical beam may exit the second harmonic crystal.

20 Claims, 6 Drawing Sheets

Related U.S. Application Data application No. 15/177,140, filed on Jun. 8, 2016, now Pat. No. 9,568,803, which is a continuation-in-part of application No. 14/719,617, filed on May 22, 2015, now Pat. No. 9,377,667.

(60) Provisional application No. 62/002,006, filed on May 22, 2014.

(51) Int. Cl.
*G02F 1/355* (2006.01)
*H01S 3/00* (2006.01)

(52) U.S. Cl.
CPC .............. *G02F 2001/3507* (2013.01); *G02F 2001/3509* (2013.01); *G02F 2201/20* (2013.01); *G02F 2203/055* (2013.01)

(56) References Cited

U.S. PATENT DOCUMENTS

| | | | |
|---|---|---|---|
| 5,850,407 A | 12/1998 | Grossman et al. | |
| 6,047,011 A | 4/2000 | Cook | |
| 6,697,391 B2 | 2/2004 | Grossman et al. | |
| 7,079,557 B1 * | 7/2006 | Yin | H01S 3/1083 359/330 |
| 7,209,282 B2 | 4/2007 | Kim et al. | |
| 7,649,680 B2 | 1/2010 | Onishi et al. | |
| 8,369,366 B2 | 2/2013 | Tojo et al. | |
| 8,929,406 B2 | 1/2015 | Chuang et al. | |
| 9,190,798 B2 * | 11/2015 | Caprara | H01S 3/0092 |
| 9,377,667 B2 * | 6/2016 | Muendel | H01S 3/0092 |
| 9,568,803 B2 | 2/2017 | Morehead et al. | |
| 2002/0196819 A1 | 12/2002 | Spinelli et al. | |
| 2005/0288653 A1 * | 12/2005 | Lai | A61B 18/22 606/10 |
| 2006/0126677 A1 | 6/2006 | Sun | |
| 2007/0041421 A1 * | 2/2007 | Duncan | G02F 1/37 372/106 |
| 2008/0158638 A1 | 7/2008 | Furuya | |
| 2009/0161703 A1 | 6/2009 | Seelert et al. | |
| 2012/0263196 A1 | 10/2012 | Pask et al. | |
| 2013/0077086 A1 | 3/2013 | Chuang | |
| 2013/0188658 A1 | 7/2013 | Starodoumov | |
| 2013/0294465 A1 | 11/2013 | Chang et al. | |
| 2014/0362880 A1 | 12/2014 | Chuang | |
| 2015/0155680 A1 | 6/2015 | Chuang et al. | |
| 2015/0338719 A1 | 11/2015 | Muendel et al. | |
| 2016/0056606 A1 | 2/2016 | Chuang | |
| 2016/0099540 A1 | 4/2016 | Chuang et al. | |
| 2017/0219912 A1 * | 8/2017 | Morehead | G02F 1/313 |
| 2018/0017841 A1 * | 1/2018 | Muendel | G02F 1/3551 |

FOREIGN PATENT DOCUMENTS

| | | |
|---|---|---|
| JP | 2000343261 A | 12/2000 |
| JP | 2002208749 | 7/2002 |
| JP | 2002/542632 | 12/2002 |
| JP | 2003/121895 | 4/2003 |
| JP | 2005/521910 | 7/2005 |
| JP | 2009/128435 | 6/2009 |
| JP | 2009/198606 | 9/2009 |
| JP | 2013515357 | 5/2013 |
| WO | WO 2010/111094 A2 | 9/2010 |
| WO | WO 2009093289 | 5/2011 |

OTHER PUBLICATIONS

Wang et al., "High Power Q-switched TEM00 Mode Diode-Pumped Solid State Lasers with > 30W Output Power at 355nm", Invited Paper, Proc of SPIE, vol. 6100, 610019-1 to 13, Feb. 2006.

European Search Report corresponding to EP 15 16 8631, dated Oct. 28, 2015, 7 pages.

Extended European Search Report for European Application No. 17174643.1; dated Oct. 10, 2017, 9 pages.

Lozovoy et al., "Quantifying Noise in Ultrafast Laser Sources and its Effect on Nonlinear Applications", Optics Express, vol. 23, No. 9, Apr. 28, 2015, 8 pages.

* cited by examiner

SECOND HARMONIC GENERATION

RELATED APPLICATION

This application is a Continuation-In-Part (CIP) of U.S. patent application Ser. No. 15/429,804, filed on Feb. 10, 2017, which is a Continuation of U.S. patent application Ser. No. 15/177,140, filed on Jun. 8, 2016 (now U.S. Pat. No. 9,568,803), which is a CIP of U.S. patent application Ser. No. 14/719,617, filed on May 22, 2015 (now U.S. Pat. No. 9,377,667), which claims priority to U.S. Provisional Application No. 62/002,006, filed May 22, 2014, the contents of which are incorporated by reference herein in their entirety.

TECHNICAL FIELD

The present disclosure relates to second harmonic generation and, more particularly, to devices and methods for second harmonic generation using a looped configuration.

BACKGROUND

Optical harmonic generation may be used to convert laser light from one wavelength to a shorter wavelength (i.e., a higher frequency). For example, frequency doubling, or second harmonic generation (SHG), may be used to obtain visible light from near infrared light. The frequency doubled light may then be used for generating frequency tripled light, spectroscopy, materials processing, optical pumping, and/or the like.

Figure 1:
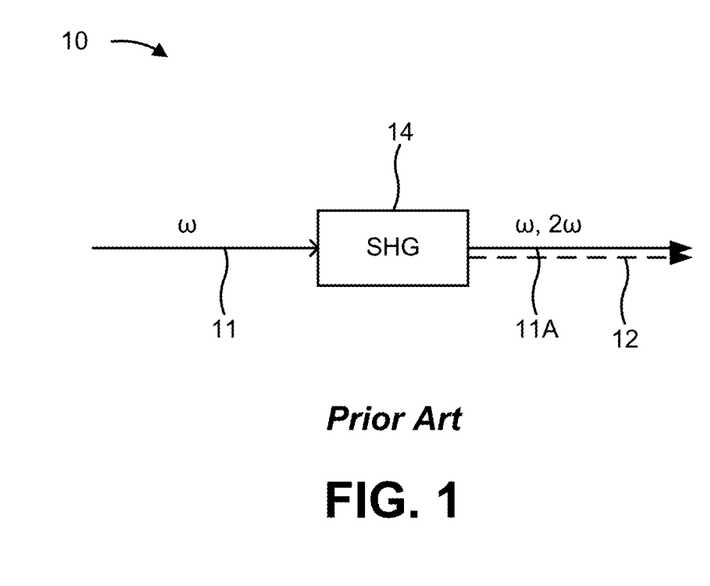
FIG. 1 illustrates a schematic block diagram of a prior art second harmonic generator.

Typically, the optical frequency of laser light is doubled using a nonlinear optical that uses a single input beam to provide a pair of photons required for conversion to the second harmonic. FIG. 1 is a diagram illustrating a prior art second harmonic generator 10. As shown in FIG. 1, prior art second harmonic generator 10 includes second harmonic crystal 14. In operation, fundamental optical beam 11 at optical frequency $\omega$ impinges on second harmonic 14. Since a nonlinear conversion efficiency of second harmonic crystal 14 is less than 100%, only a portion of fundamental optical beam 11 is frequency doubled within second harmonic crystal 14, so that second harmonic beam 12 at a second harmonic frequency $2\omega$ exits second harmonic crystal 14 together with an unconverted portion 11A of fundamental optical beam 11 at optical frequency $\omega$. Thus, two beams exit second harmonic 14: unconverted portion 11A of fundamental optical beam 11 and second harmonic beam 12. In some applications, second harmonic beam 12 and unconverted portion 11A may impinge on a third harmonic crystal (not shown), which converts a portion of these beams into a third harmonic beam at a third harmonic frequency. Alternatively, in some cases, second harmonic beam 12 may be propagated for another purpose. For example, prior art second harmonic generator 10 may include a dichroic mirror (or filter) that redirects unconverted portion 11A and transmits second harmonic beam 12 as an output.

SUMMARY

According to some possible implementations, a second harmonic generator, may include: a combiner to combine a fundamental optical beam with a residual fundamental optical beam; and a second harmonic crystal, coupled to the combiner, to generate a second harmonic optical beam from the fundamental optical beam and the residual fundamental optical beam, wherein, upon generation of the second harmonic optical beam, the residual fundamental optical beam may exit the second harmonic crystal.

According to some possible implementations, a method may include: propagating, by a second harmonic generator, a fundamental optical beam through a second harmonic crystal to generate a second harmonic optical beam from the fundamental optical beam and a residual fundamental optical beam, wherein, upon generation of the second harmonic optical beam, the residual fundamental optical beam may exit the second harmonic crystal; and propagating, by the second harmonic generator, the residual fundamental optical beam such that the residual fundamental optical beam enters the second harmonic crystal with the fundamental optical beam so as to generate the second harmonic optical beam.

According to some possible implementations, a laser may include: a combiner to combine a fundamental optical beam with a residual fundamental optical beam; a second harmonic to generate a second harmonic optical beam from the fundamental optical beam and the residual fundamental optical beam, wherein, upon generation of the second harmonic optical beam, the residual fundamental optical beam may exit the second harmonic crystal; and one or more optical components to direct the residual fundamental optical beam to the combiner.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

A typical prior art second harmonic generation scheme, such as that illustrated by prior art second harmonic generator 10 of FIG. 1, uses Type-I collinear second harmonic generation. Here, fundamental photons to be combined are identical photons within a single incoming beam (e.g., fundamental optical beam 11). In Type-II second harmonic generation, each second-harmonic photon is formed from a pair of fundamental photons in linear polarization states that are orthogonal to one another. Thus, the input optical beam may be, for example, a single circularly-polarized beam or a single linearly-polarized beam oriented at 45° to two linear states to be combined in the second harmonic generator (in either case providing equal numbers of photons in each orthogonal polarization).

In addition to being Type-I phasematching or Type-II phasematching, phasematching can be critical or non-critical. Non-critical phasematching has well-known advantages regarding walk-off and angular sensitivity. However, non-critical phasematching may be difficult to achieve in a prior art second harmonic generation configuration (e.g., such as that shown in FIG. 1) since non-critical phasematching relies on precise coincidences of refractive indices associated with a non-linear crystal material, generally assisted by temperature tuning. Further, in the prior art second harmonic generation configuration non-collinear phasematching is not possible (e.g., since both incoming photons are in the same fundamental optical beam). As a result of these constraints, for a given non-linear crystal, there is little opportunity to improve and/or optimize a non-linear strength conversion rate through selection of orientation, polarization orientation, or phasematching type, or to improve and/or optimize an output beam quality, an acceptance bandwidth, an angular acceptance, and/or the like, through the use of non-critical phasematching.

Another drawback of the prior art second harmonic generator is that tight focusing of the fundamental optical beam into the second harmonic crystal is typically required in order to obtain a reasonable conversion efficiency. Such tight focusing results in a small spot diameter of the fundamental optical beam that may compromise beam quality (e.g., due to a beam walk-off effect). Further, tight focusing of the fundamental optical beam may result in degradation of a surface of the second harmonic crystal 14 (e.g., after tens or hundreds of hours of exposure).

Some implementations described herein provide a second harmonic generator that uses a looped configuration for second harmonic generation. In some implementations, the looped configuration enables opportunities for a non-linear strength conversion rate to be improved and/or optimized through selection of orientation, polarization orientation, phasematching type, and/or the like. Further, the looped configuration enables opportunities for improving and/or optimizing an output beam quality, an acceptance bandwidth, an angular acceptance, and/or the like, through the use non-critical phasematching (e.g., as compared to the prior art second harmonic generator). Further, the looped configuration for second harmonic generation improves conversion efficiency of the second harmonic generator (e.g., as compared to the prior art second harmonic generator).

FIGS. 2A-2D are diagrams showing an example implementation of a second harmonic generator 20 with a looped configuration for second harmonic generation.

Figure 2A:
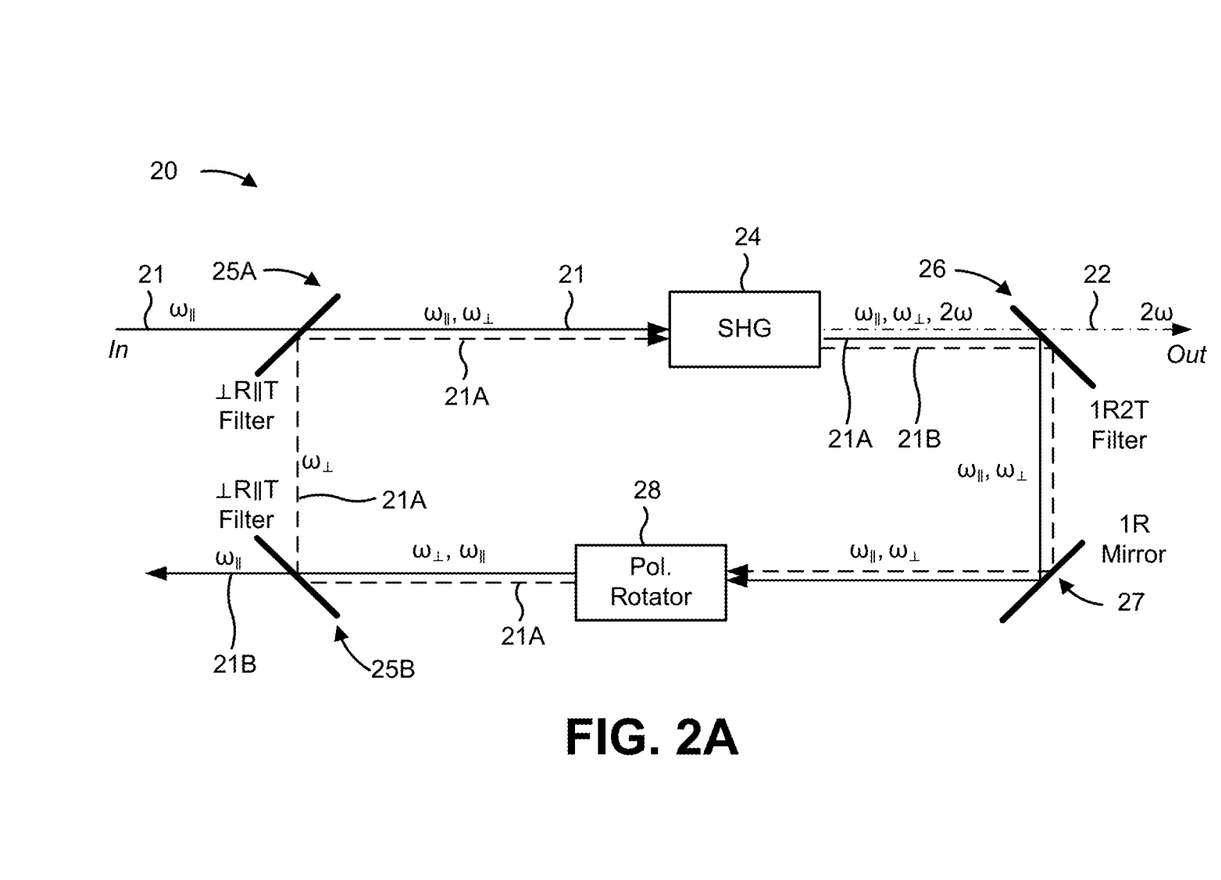
FIGS. 2A-2D are diagrams showing an example implementation of a second harmonic generator with a looped configuration for second harmonic generation.

As shown in FIG. 2A, second harmonic generator 20 may include a second harmonic 24, a polarization filter 25A, a polarization filter 25B, a frequency filter 26, a mirror 27, and a polarization rotator 28. Components of second harmonic generator 20 are described below, followed by a description of an example operation of second harmonic generator 20.

Second harmonic 24 includes a component for generating a second harmonic optical beam. For example, second harmonic may include a comprising Lithium Niobate or another type of non-linear crystal. Notably, in second harmonic generator 20, second harmonic 24 may perform Type-II conversion, whereby second harmonic crystal 24 uses photons in orthogonal polarizations for performing conversion to the second harmonic. However, in some implementations, as described below in connection with FIG. 3, a looped second harmonic generator may include a second harmonic crystal that performs Type-I conversion (e.g., whereby the second harmonic uses photons in the same polarization for performing conversion to the second harmonic). In some implementations, second harmonic 24 may be comprised of different materials depending on wavelength, power level, and/or one or more other parameters.

Polarization filter 25 (e.g., polarization filter 25A, polarization filter 25B) includes a component for transmitting (T) a beam at a fundamental optical frequency ω in a first polarization (e.g., a polarization that is parallel to the plane of the page in FIG. 2A, identified as a ∥ polarization), and reflecting (R) a beam at a fundamental optical frequency ω in a second polarization (e.g., a polarization that is orthogonal to the plane of the page in FIG. 2A, identified as a ⊥ polarization). Thus as shown in FIG. 2A, polarization filter 25 may be referred to and/or identified as a ⊥R∥T filter. By transmitting the fundamental optical beam in the ∥ polarization and reflecting the fundamental optical beam in the ⊥ polarization, polarization filter 25A may act as a polarizing combiner (e.g., a combiner that combines beams in different polarizations). Notably, the ∥ polarization and the ⊥ polarization are provided as an example of orthogonal polarizations associated with performing Type-II conversion, and other orthogonal polarizations (e.g., not parallel or perpendicular to the plane of FIG. 2) may be used, in some implementations.

Frequency filter 26 includes a component for reflecting (R) a beam at a fundamental (1) optical frequency ω, and transmitting (T) a beam at a doubled (2) optical frequency 2ω. Thus, as shown in FIG. 2A, frequency filter 26 may be referred to and/or identified as a 1R2T filter.

Mirror 27 includes a component for reflecting (R) a beam at a fundamental optical frequency ω in any polarization (e.g., in the ⊥ polarization, in the ∥ polarization, and/or the like). Thus, as shown in FIG. 2A, mirror 27 may be referred to and/or identified as a 1R mirror.

Polarization rotator 28 includes a component for rotating a polarization of a beam (e.g., by 90°). For example, polarization rotator 28 may rotate a fundamental optical beam from the ∥ polarization to the ⊥ polarization, and may rotate a fundamental optical beam from the ⊥ polarization to the ∥ polarization, as described in further detail below.

In operation of second harmonic generator 20, fundamental optical beam 21 (e.g., at the fundamental optical frequency ω and in the ∥ polarization) is launched toward the polarization filter 25A. As shown, polarization filter 25A combines fundamental optical beam 21 with residual fundamental optical beam 21A (e.g., at the fundamental optical frequency ω and in the ⊥ polarization), and fundamental optical beam 21 and residual fundamental optical beam 21A are propagated to second harmonic crystal 24. Second harmonic crystal 24 may be coupled to polarization filter 25A for generating second harmonic optical beam 22 at the doubled optical frequency 2ω from fundamental optical beam 21 and residual fundamental optical beam 21A. Second harmonic optical beam 22 is generated in second harmonic crystal 24 (e.g., using fundamental optical beam 21 and residual fundamental optical beam 21A), and is directed to an output of second harmonic generator 20.

Upon generation of second harmonic optical beam 22, residual fundamental optical beam 21A (e.g., an unconverted portion of fundamental optical beam 21 at the fundamental optical frequency ω and in the ∥ polarization) may exit second harmonic crystal 24, and be directed, by frequency filter 26 and mirror 27, through polarization rotator 28 such that residual fundamental optical beam 21A is rotated to the ⊥ polarization. As shown, the polarization rotated residual fundamental optical beam 21A may be directed by polarization filter 25B to polarization filter 25A for combining with fundamental optical beam 21.

Further, upon generation of second harmonic optical beam 22, residual fundamental optical beam 21B (e.g., an unconverted portion of residual fundamental optical beam 21A at the fundamental optical frequency ω and in the ⊥ polarization) may exit second harmonic crystal 24, and be directed, by frequency filter 26 and mirror 27, through polarization rotator 28 such that residual fundamental optical beam 21B is rotated to the ∥ polarization. As shown, the polarization rotated residual fundamental optical beam 21B is directed through polarization filter 25B, where the polarization rotated residual fundamental optical beam 21B may be absorbed by an optional optical beam dump (not shown).

Figure 2B:
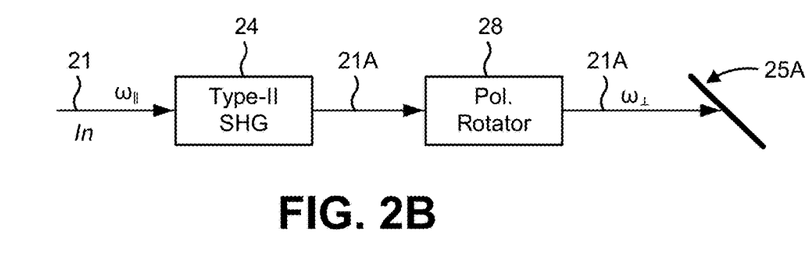
Figure 2C:
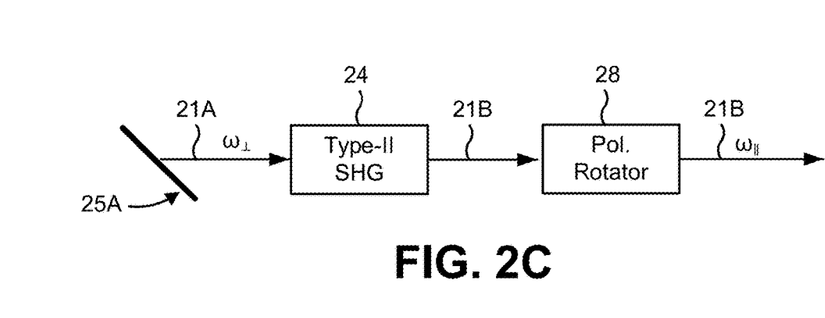
Figure 2D:
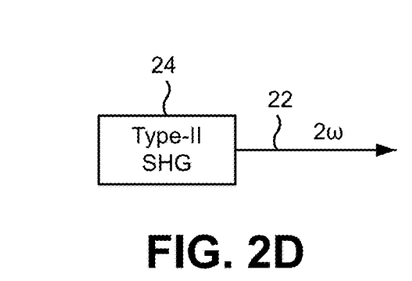

The optical paths of fundamental optical beam 21, residual fundamental optical beam 21A, residual fundamental optical beam 21B, and second harmonic optical beam 22 are further shown by FIGS. 2B-2D. As shown in FIG. 2B, fundamental optical beam 21 (e.g., at fundamental optical frequency ω and in the ∥ polarization) propagates in sequence through second harmonic 24, then polarization rotator 28 as residual fundamental optical beam 21A, and then is directed to polarization filter 25A (e.g., at fundamental optical frequency ω and in the ⊥ polarization).

As shown in FIG. 2C, residual fundamental optical beam 21A then propagates through second harmonic crystal 24, then polarization rotator 28 as residual fundamental optical beam 21B, and then is directed out of second harmonic generator 20 (e.g., at fundamental optical frequency ω and in the ∥ polarization) to, for example, an optional optical beam dump.

As shown in FIG. 2D, second harmonic optical beam 22 is generated in second harmonic crystal 24 (e.g., using fundamental optical beam 21 and residual fundamental optical beam 21A), and is directed to an output of second harmonic generator 20.

The number and arrangement of components shown in FIGS. 2A-2D are provided as an example. In practice, there may be additional components, fewer components, different components, or differently arranged components than those shown in FIGS. 2A-2D. For example, while the second harmonic generation scheme shown in FIG. 2A uses a collinear phasematching technique, in some implementations, one or more additional and/or different phasematching techniques may be implemented in second harmonic generator 20, such as critical phasematching, noncritical phasematching, non-collinear phasematching, quasi-phase matching (e.g., using periodically-poled materials), and/or the like. In some implementations, such techniques are enabled due to the looped configuration of second harmonic generator 20 (e.g., since photons of a given photon pair, from which second harmonic optical beam 22 is generated, are from different optical beams), as described above.

Further, in some implementations, one or more types of components (e.g., mirrors, filters, and/or the like) may be used (e.g., in addition to or in place of those shown in FIG. 2A) to separate or combine optical beams within second harmonic generator 20, such as dichroic or trichroic thin-film filters, polarization filters, absorptive filters, prisms, gratings, and/or other types of filters and/or mirrors. Additionally, or alternatively, various orderings and/or combinations of components (e.g., filters, crystals, mirrors, and/or the like) may be used in second harmonic generator 20.

Additionally, while not shown in FIGS. 2A-2D, in some implementations, one or more components (e.g., in addition to or in place of those shown in FIG. 2A), such as one or more waveplates, non-planar beam paths, lenses, and/or the like, may be included at appropriate locations in second harmonic generator 20 in order to provide a desired polarization state or a desired beam size and/or profile depending on specifics of the conversion configuration.

Furthermore, two or more components shown in FIGS. 2A-2D may be implemented within a single component, or a single component shown in FIGS. 2A-2D may be implemented as multiple, distributed components. Additionally, or alternatively, a set of components (e.g., one or more components) of second harmonic generator 20 may perform one or more functions described as being performed by another set of second harmonic generator 20.

Figure 3:
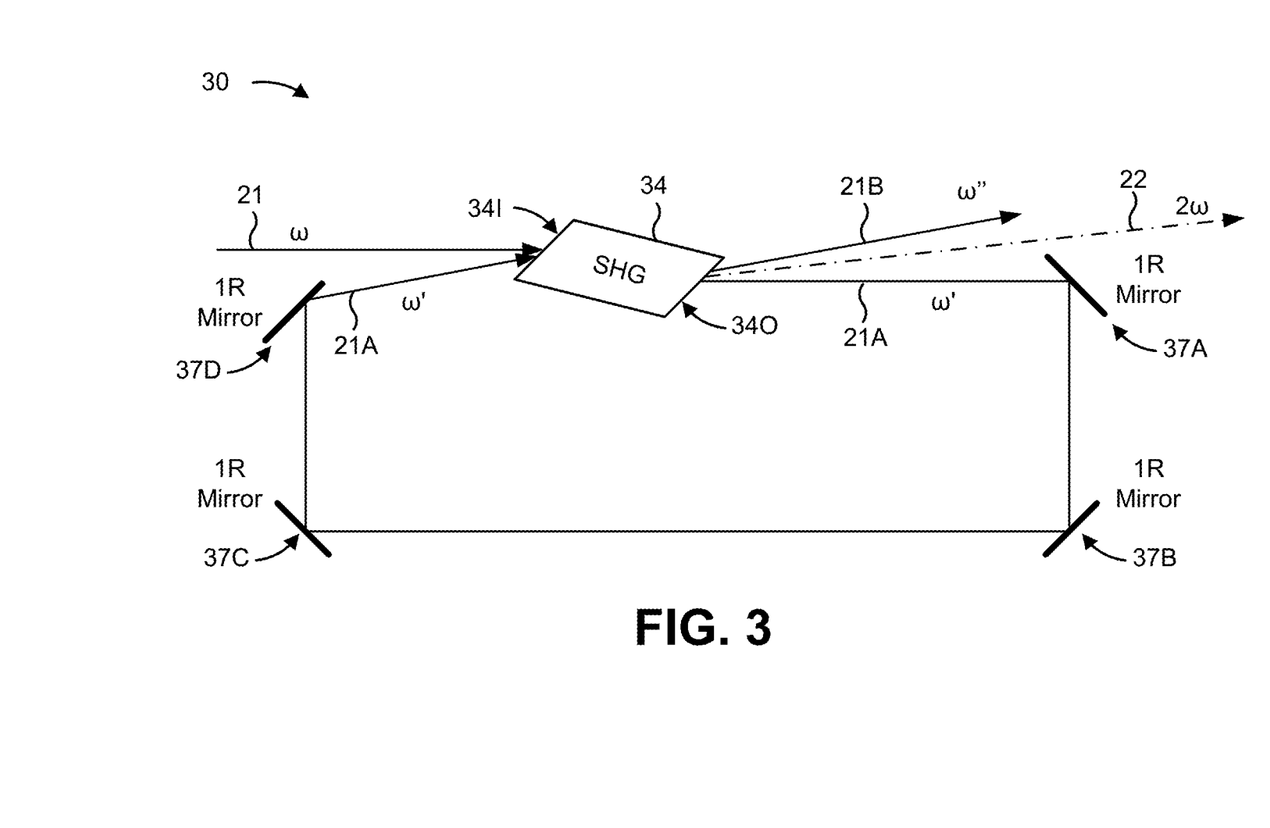
FIG. 3 is a diagram showing another example implementation of a second harmonic generator with a looped configuration for second harmonic generation.

FIG. 3 is a diagram showing another example implementation of a second harmonic generator 30 with a looped configuration for second harmonic generation.

As shown in FIG. 3, second harmonic generator 30 may include a second harmonic 34 and a set of mirrors 37A through 37D. Components of second harmonic generator 30 are described below, followed by a description of an example operation of second harmonic generator 30.

Second harmonic crystal 34 includes a component for generating a second harmonic optical beam using photons in the same polarization or in perpendicular polarizations (i.e., a for performing Type-I conversion or a for performing Type-II conversion). In some implementations, second harmonic crystal 34 may be comprised of Lithium Niobate, or another type of non-linear crystal.

As shown in FIG. 3, in some implementations, second harmonic crystal 34 may include input optical face 34I and output optical face 34O slanted relative to fundamental optical beam 21, residual fundamental optical beam 21A, residual fundamental optical beam 21B, and/or second harmonic optical beam 22. For example, in some implementations, input optical face 34I and/or output optical face 34O may be slanted at a Brewster angle relative to fundamental optical beam 21, residual fundamental optical beam 21A, residual fundamental optical beam 21B, and/or second harmonic optical beam 23.

Mirror 37 (e.g., mirror 37A, mirror 37B, mirror 37C, or mirror 37D) includes a component for reflecting (R) a beam at a fundamental optical frequency ω (e.g., in any polarization). Thus, as shown in FIG. 3, mirror 37 may be referred to and/or identified as a 1R mirror. In some implementations, mirror 37 may be a regular mirror (i.e., not a dichroic mirror) since beam combining and splitting functions are provided by spatial multiplexing in second harmonic generator 30 (e.g., whereby a given beam is reflected by a mirror whereas another beam bypasses the mirror spatially). In some implementations, mirror 37D may act as an angular combiner by steering residual fundamental optical beam 21A toward second harmonic 34 such that residual fundamental optical beam 21A is combined with fundamental optical beam 21 (e.g., as described below). In some implementations, mirror 37D may include a mirror, as indicated above, or another optical element that steers residual fundamental optical beam 21A and/or fundamental optical beam 21 such that residual fundamental optical beam 21A and fundamental optical beam 21 overlap (i.e., are combined) at second harmonic crystal 34. For example, in some implementations, mirror 37D may include a prism, a grating, a lens, an optical fiber, and/or the like, that is arranged to steer residual fundamental optical beam 21A and/or fundamental optical beam 21.

In operation, an input of fundamental optical beam 21 (e.g., at the fundamental optical frequency ω) is coupled to second harmonic crystal 34. As further shown, second harmonic crystal 34 is coupled to mirror 37D such that residual fundamental optical beam 21A (e.g., at the fundamental optical frequency ω and identified as ω' in FIG. 3) is combined with fundamental optical beam 21 at second harmonic crystal 34. Second harmonic crystal 34 generates second harmonic optical beam 22, at the doubled optical frequency 2ω, from fundamental optical beam 21 and residual fundamental optical beam 21A, and second harmonic optical beam 22 is directed to an output of second harmonic generator 30.

Upon generation of second harmonic optical beam 22, residual fundamental optical beam 21A (e.g., an unconverted portion of fundamental optical beam 21) may exit second harmonic crystal 34. As shown, residual fundamental optical beam 21A may be directed, via mirrors 37A through 37D, back to input optical face 34I of second harmonic crystal 34 for combining with fundamental optical beam 21.

Further, upon generation of second harmonic optical beam 22, residual fundamental optical beam 21B (e.g., an unconverted portion of residual fundamental optical beam 21A at the fundamental optical frequency ω and identified as ω" in FIG. 3) may exit second harmonic 34, and be directed out of second harmonic generator 30 to, for example, an optional optical beam dump (not shown).

As described above, second harmonic optical beam 22 is generated in second harmonic crystal 34 (e.g., using fundamental optical beam 21 and residual fundamental optical beam 21A), and is directed as an output of second harmonic generator 30.

As shown in FIG. 3, in some implementations, second harmonic crystal 34 may be oriented such that fundamental optical beam 21 and residual fundamental optical beam 21A impinge on the input optical face 34I of second harmonic crystal 34 at a non-normal (e.g., acute) angle of incidence. In some implementations, fundamental optical beam 21 and residual fundamental optical beam 21A may form a non-zero (acute) angle with respect to each other.

Thus, in some implementations, fundamental optical beam 21 and residual fundamental optical beam 21A may enter second harmonic crystal 34 at different angles, but at angles that are close enough to being parallel in order to ensure a sufficiently long interaction length within second harmonic crystal 34 (e.g., a length which may from less than 1 mm for a short-pulsed laser to several tens of mm for a continuous wave (CW) laser, where the length is typically limited by a practical fabrication length of second harmonic crystal 34). Here, since fundamental optical beam 21 and residual fundamental optical beam 21A are non-collinear, a non-collinear phasematching technique is used within second harmonic crystal 34 in order to provide efficient non-linear conversion. For example, the angle between fundamental optical beam 21 and residual fundamental optical beam 21A, and/or a relation of these angles to crystal axes of second harmonic crystal 34, may be chosen such that effective refractive indices, associated with fundamental optical beam 21, residual fundamental optical beam 21A, and second harmonic optical beam 22, allow these optical beams to propagate in a correct phase relationship for efficient conversion. In some implementations, the adjustability of the angle between fundamental optical beam 21 and residual fundamental optical beam 21A (e.g., due to the use of the looped configuration) for achieving phasematching provides greater flexibility in selecting a phasematching configuration, a type of second harmonic crystal 34, and/or the like, in order to improve and/or optimize conversion efficiency and/or one or more other characteristics. In some implementations, these techniques may be used in conjunction with tuning using another technique, such as temperature adjustment, tuning of beam angle with respect to the axes, and/or the like.

As a particular example, in a prior art second harmonic generator that uses conventional collinear phasematching (e.g., second harmonic generator 10) the refractive index in a particular orientation is invariably different at the second harmonic optical frequency than at the fundamental optical frequency due to dispersion. Thus, the prior art second harmonic generator may not use a single polarization for both, and a mix of polarizations between input and output must be used. However, with non-collinear phasematching, input beams can be angled in some second harmonic crystals such that phasematching can be achieved with both input (e.g., fundamental optical beam 21 and residual fundamental optical beam 21A) and output (e.g., second harmonic optical beam 22) in the same polarization. Here, because the non-linear coefficient conversion rate of the second harmonic crystal depends on polarization orientations with respect to one another and to the axes, this flexibility may allow stronger non-linear coefficients to be utilized, thereby increasing the conversion efficiency. Thus, by enabling non-collinear phasematching, a looped second harmonic generator may achieve increased conversion efficiency as compared to the prior art second harmonic generator.

As another particular example of the utility of non-collinear phasematching enabled by the looped configuration for second harmonic generation, non-collinear phasematching may enable non-critical phasematching (e.g., when an output and its polarization are aligned with the axes, and phasematching is first-order insensitive to tilt) to be achieved in some second harmonic crystals. In some implementations, such a non-critical phasematching configuration may reduce an amount of beam walk-off and/or an amount of reduced angular sensitivity, for example, by accommodating an input beam with relatively high divergence.

Figure 4:
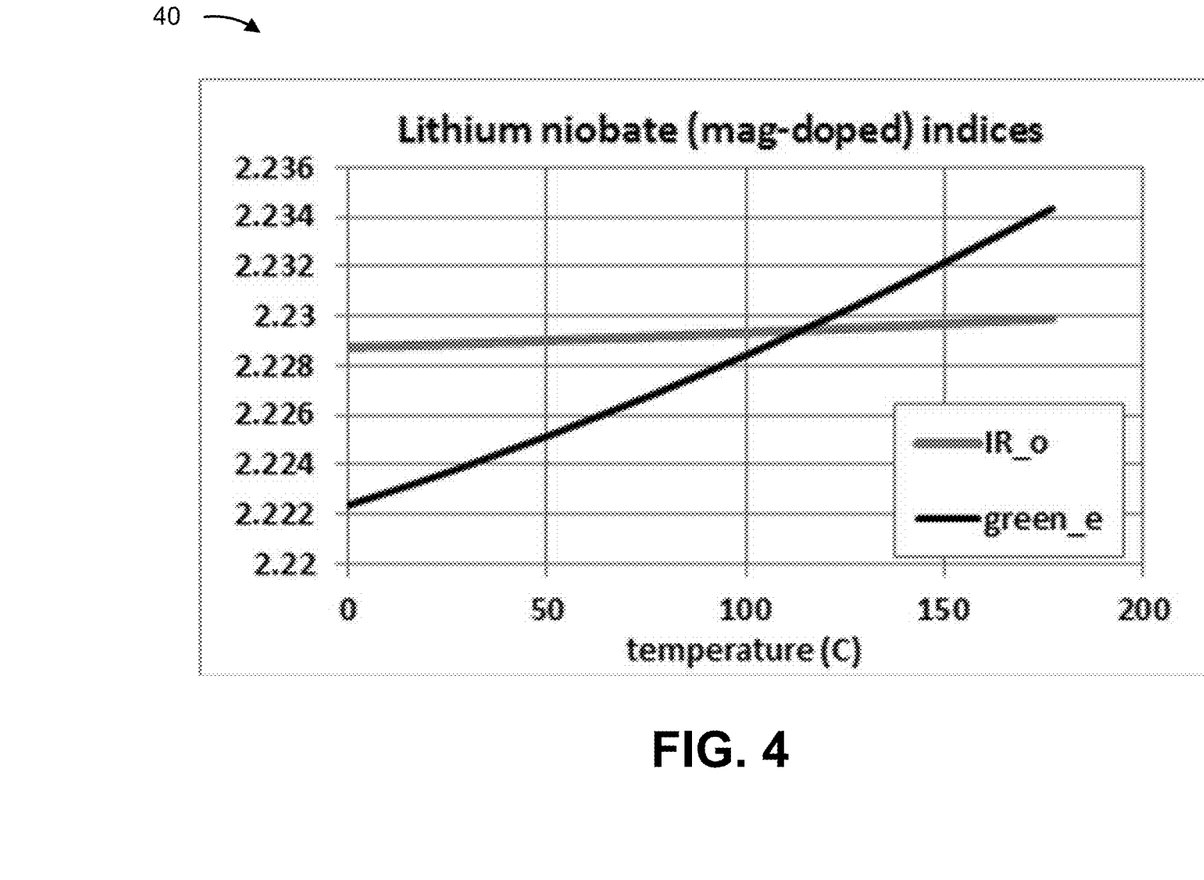
FIG. 4 is an example graphical representation associated with an example of non-collinear phasematching enabled by a looped configuration for second harmonic generation.

FIG. 4 is an example graphical representation 40 associated with an example of non-collinear phasematching enabled by a looped configuration for second harmonic generation (e.g., such as that shown in FIG. 3). FIG. 4 is a diagram illustrating ordinary refractive indices at 1064 nanometers (nm) (e.g., an IR wavelength) and extraordinary refractive indices at 532 nm (e.g., a green wavelength) across a temperature range from 0° C. to approximately 180° C. for a second harmonic crystal 34 formed from magnesium-doped Lithium Niobate.

As show by FIG. 4, a temperature where these indices are equal, and therefore phasematched, is approximately 110° C. ($T_0$=110° C.). In this example, this phasematching temperature may be reduced through use of non-collinear phasematching. For example, due to the use of the looped configuration, a pair of beams at the IR wavelength (e.g., fundamental optical beam 21 and residual fundamental optical beam 21A) may be directed such that these beams are incident on the second harmonic crystal at directions in the ordinary plane with an opening half-angle φ. The refractive indices associated with the IR beams are ordinary $n_{o1}$ and a refractive index, associated with a generated second harmonic optical beam at the green wavelength (e.g., second harmonic optical beam 22), is purely extraordinary $n_{e2}$. Here, phasematching is represented by an equality of a green wavevector to a sum of two IR wavevectors and, thus, $n_{e2}=n_{o1}\cos\phi$. For temperatures below $T_0$, the non-collinearity enabled by the looped configuration can lower the ordinary refractive index, associated with the IR wavelength, to the extraordinary refractive index associated with the green wavelength. For example, an approximate relationship between these indices may be represented by the following formula:

$$n_{e2}=n_{o1}[1-3\times10^{-5}(T_0-T)].$$

Setting this formula to be equal to the non-collinear $n_{e2}=n_{o1}\cos\phi \approx n_{o1}(1-\phi^2/2)$, the following formula is derived:

$$\phi^2=6\times10^{-5}(T_0-T).$$

Therefore, in order to operate at, for example, a temperature of approximately 30° (T=30°), the above formula can be evaluated to yield $\phi$=0.07 radians, which corresponds to a 4° half angle, or an 8° full angle, between the two IR beams. In this way, non-collinear phasematching may enable non-critical phasematching to be more readily achieved, thereby enabling additional phasematching configurations to be considered for implementation in the looped second harmonic generation scheme (e.g., as compared to the prior art second harmonic generator).

As indicated above, FIG. 4 is provided merely as an example. Other examples are possible and may differ from what was described with regard to FIG. 4.

Returning to FIG. 3, in some implementations, fundamental optical beam 21 may be polarized in the plane of FIG. 3 (e.g., ∥ polarization), perpendicular to the plane of FIG. 3 (e.g., in the ⊥), at another angle with respect to the plane of FIG. 3 (e.g., at a 45° angle), and/or the like. Thus, in some implementations, second harmonic crystal 34 may be selected such that second harmonic crystal 34 performs Type-I conversion or Type-II conversion. In a case where second harmonic crystal 34 performs Type-II conversion, second harmonic generator may include a polarization rotator (not shown) that rotates residual fundamental optical beam 21A (e.g., by 90°) with respect to fundamental optical beam 21.

Further, as indicated in FIG. 3, in some implementations, the looped configuration of second harmonic generator 30 may not require waveplates, dichroic mirrors, and/or the like, in order to separate residual fundamental optical beam 21A and/or residual fundamental optical beam 21B from second harmonic optical beam 22. Rather, these beams may be spatially separated as indicated in FIG. 3 (e.g., such that mirrors 37A through 37D couple only residual fundamental optical beam 21A to second harmonic crystal 34). In some implementations, when fundamental optical beam 21 and residual fundamental optical beam 21A have different angles of incidence on input optical face 34I of second harmonic crystal 34, fundamental optical beam 21 and residual fundamental optical beam 21A may be substantially non-collinear within second harmonic crystal 34.

The number and arrangement of components shown in FIG. 3 are provided as an example. In practice, there may be additional components, fewer components, different components, or differently arranged components than those shown in FIG. 3. For example, while the second harmonic generation scheme shown in FIG. 3 uses a non-collinear phasematching technique with Type-I conversion, in some implementations, one or more additional and/or different phasematching techniques (e.g., with Type-I conversion or Type-II conversion) may be implemented in second harmonic generator 30, such as critical phasematching, non-critical phasematching, collinear phasematching, quasi-phase matching, and/or the like. In some implementations, such techniques are enabled due to the looped configuration of second harmonic generator 30, as described above. Further, various orderings and/or combinations of components (e.g., filters, crystals, mirrors, and/or the like), may be used in second harmonic generator 20.

Additionally, while not shown in FIG. 3, in some implementations, one or more components (e.g., in addition to or in place of those shown in FIG. 3), such as one or more waveplates, non-planar beam paths, lenses, and/or the like, may be included at appropriate locations in second harmonic generator 30 in order to provide a desired polarization state or a desired beam size and/or profile depending on specifics of the conversion configuration.

Furthermore, two or more components shown in FIG. 3 may be implemented within a single component, or a single component shown in FIG. 3 may be implemented as multiple, distributed components. Additionally, or alternatively, a set of components (e.g., one or more components) of second harmonic generator 30 may perform one or more functions described as being performed by another set of second harmonic generator 30.

In some implementations, the looped configurations described above may provide a higher efficiency conversion than the prior art second harmonic generator 10 of FIG. 1. For example, the second harmonic conversion efficiency depends on an input power density at the fundamental optical frequency ω. In prior art second harmonic generator 10, the total power input to second harmonic crystal 14 is limited to the total power input P to prior art second harmonic generator 10. The total optical power input to second harmonic crystal 24/34 (e.g., of second harmonic generator 20 and second harmonic generator 30, respectively) is actually greater than P, because at least some of the power at ω may be used twice (e.g., due to the looped configuration where residual fundamental optical beam 21A is used along with fundamental optical beam 21 for generating second harmonic optical beam 22). The result is that the power density—and, therefore, the conversion efficiency—is higher in a looped second harmonic generator (e.g., second harmonic generator 20, second harmonic generator 30, and/or the like) than in prior art second harmonic generator 10.

Further, in the looped second harmonic generator, residual fundamental optical beam 21B is prevented from re-entering second harmonic crystal 24/34 in order to avoid potential optical interference effects. In other words, optical paths of fundamental optical beam 21 and residual fundamental optical beam 21A optical may be configured so as not to form a closed loop (i.e., an open loop) at individual optical frequencies, or an optical cavity at an individual optical frequency. Avoiding the closed loop or the optical cavity at individual optical frequencies may facilitate stability of the second harmonic generation process.

In some implementations, second harmonic crystal 24/34 may utilize Brewster-angle entry and/or exit. In some implementations, Brewster-angle entry and/or exit may reduce surface loss on second harmonic crystal 24/34 (e.g., as an alternative to an anti-reflection (AR) coating, which can be damage-prone). In some implementations, Brewster surfaces are low-loss only for a particular polarization (e.g., for the p polarization, which may correspond to the ∥ polarization described above). Thus, in an angle-multiplexed second harmonic generation scheme (e.g., such as that shown in FIG. 3) where both fundamental optical beam 21, residual fundamental optical beam 21A, and second harmonic optical beam 22 are in the p polarization, these beams may have low surface loss when Brewster-angle entry and/or exit is utilized, which assists in achieving high conversion efficiency. Notably, while these beams may have different angles of incidence with respect to second harmonic crystal 34, an amount of surface loss is generally acceptable within a few degrees (e.g., 5° or less) of the optimal Brewster angle. Another benefit of using Brewster-angle entry and/or exit is that refraction at an output (e.g., at output optical face 34O) may be used to separate second harmonic optical beam 22 from residual fundamental optical beam 21A and residual fundamental optical beam 21B (e.g., as shown in FIG. 3).

In some implementations, Brewster entry and/or exit can also be used in systems where not all the beams are in the p polarization. For example, in a Type-II conversion scheme (e.g., such as that shown in FIG. 2A), one input and an output may be p-polarized, thereby having low surface loss on the second harmonic crystal. The other input may be s-polarized (e.g., which may correspond to the ⊥ polarization described above), and the corresponding loss may be accepted, or an AR coating, optimized for the s polarization, may be applied to second harmonic crystal. In some implementations, if an uncoated Brewster surface is used, then the s-polarized input may be residual fundamental optical beam 21A (e.g., rather than fundamental optical beam 21), in order to cause surface loss occurs to occur only (e.g., at an input face of the second harmonic crystal) since loss of residual fundamental optical beam 21A at an output face of the second harmonic crystal does not impact conversion efficiency.

Another feature of the looped second harmonic generator (e.g., second harmonic generator 20, second harmonic generator 30, and/or the like) is that, since fundamental optical beam 21 and residual fundamental optical beam 21A are launched separately into second harmonic crystal 24, the position and angle of fundamental optical beam 21 and residual fundamental optical beam 21A can be optimized for a specific conversion configuration by an adjustment of another component of the looped second harmonic generator (e.g., polarization filter 25A, polarization filter 25B, mirror 37C, mirror 37D, and/or the like). Thus, for example, a birefringent or dispersive walk-off plate may not be needed for walk-off compensation. Similarly, for non-collinear phase matching, a prism or other dispersive component may not be needed to create a desired angle between fundamental optical beam 21 and residual fundamental optical beam 21A.

Further, because of the time required for light to travel around the looped second harmonic generator, residual fundamental optical beam 21A arrives at second harmonic crystal 24/34 delayed with respect to fundamental optical beam 21. Thus, in general, this configuration may be adaptable for operation with input pulses that are longer in duration than the time required for light to travel around the loop. A dimension of such a loop may be, for example, one or more centimeters (e.g., 3 centimeters (cm)), corresponding to pulse duration on the order of approximately 100 picoseconds. Thus, the looped second harmonic conversion techniques described above may be well suited for laser systems generating nanosecond or longer pulses, for example Q-switched solid-state lasers, as well as CW lasers. Smaller loops addressing picosecond pulses (e.g., from mode-locked lasers) may be built using micro-optics of millimeter or smaller size.

The looped configuration may also be used with multiple pulses, each of which has a pulse length that is shorter than the loop round-trip time, if the loop round-trip time is selected to be approximately equal to the pulse separation time, or a multiple of the pulse separation time. In the latter case, the input to second harmonic crystal 24/34 includes a new pulse and a pulse that was generated from an earlier pulse. For example, a CW mode-locked laser may continuously deliver pulses of duration about 10 picoseconds or shorter at repetition rates in the range of tens of 1 MHz to 1 GHz. With a 200 MHz mode-locked laser, for example, a looped second harmonic generator with a loop of round-trip time of 5 nanoseconds, corresponding to 150 cm total optical path length, would allow each pulse to be doubled using light from the preceding pulse. This configuration would provide the same benefits of improved conversion efficiency as in the case of a single longer pulse. Even for a pulse burst consisting only of two pulses, there are benefits, since two input pulses are effectively being combined into one second harmonic pulse, a greater output peak power may be generated for a given peak input power.

In some implementations, a delay time (herein referred to as harmonic generator delay time) of a looped second harmonic generator (e.g., second harmonic generator 20, second harmonic generator 30, and/or the like) may be designed to be approximately equal to, or an approximate integer multiple of, a round-trip time of a laser source (herein referred to as a laser source round-trip time). For example, the delay time of the looped second harmonic generator may be designed such that the delay time is approximately equal to, or is an integer multiple of, a laser source round-trip time of a laser source that provides fundamental optical beam 21.

The delay time of a harmonic generator may be defined as an amount of time for a beam to travel through the harmonic generator. The delay time may also be considered as the optical path length travelled by the beam in the harmonic generator. The optical path length travelled is related to the physical separation of the components of the looped second harmonic generator and refractive indices of materials through which the beam passes. A round-trip time is a more specific case for a delay time where a start point and an end point are the same point.

Using FIG. 2A as an example, a round-trip time for a beam through second harmonic generator 20 may be defined as an amount of time from a time when fundamental optical beam 21 passes through polarization filter 25A to a time at which residual fundamental optical beam 21A, originating from that fundamental optical beam 21, reaches the same polarization filter 25A. Other points in the optical path where residual fundamental optical beam 21A (or 21B) overlaps fundamental optical beam 21 (or 21A) may be used to define the round-trip time for a beam in second harmonic generator 20.

Using FIG. 3 as another example, a round-trip time for a beam through second harmonic generator 30 may be defined as an amount of time from a time when fundamental optical beam 21 is incident on input optical face 34I of second harmonic crystal 34 to a time at which residual fundamental optical beam 21A, originating from that fundamental optical beam 21, reaches input optical face 34I of second harmonic crystal 34. Other points in the optical path where residual fundamental optical beam 21A (or 21B) overlaps fundamental optical beam 21 (or 21A) may be used to define the round-trip time for a beam in second harmonic generator 30.

The laser source round-trip time may be defined as an amount of time for a beam of light to traverse a cavity of the laser source fully, so as to end up traveling in the same direction as at the outset. For example, in a linear cavity, the laser source round-trip time is an amount of time for a beam to travel from a particular point within the cavity, reflect from one cavity end mirror, reflect from the other cavity end mirror, and travel back to the same particular point within the cavity, in the process also twice traversing the laser gain medium or media. In a typical case, fluctuations of the laser source approximately repeat on successive round-trips associated with the laser source.

In some implementations, a laser source of fundamental optical beam 21 may operate in a multi-longitudinal mode. In such a case, power of the laser source may fluctuate due to mode beating. Generally, for a solid-state laser source, such fluctuations occur on a picosecond timescale and, on the picosecond timescale, the power output may vary from near zero to multiple times an average power output. Since a laser source round-trip time may be several nanoseconds, there may be thousands of fluctuations during a given round-trip of the laser source, causing noise to be introduced into the optical beam output by the laser source.

The typical standard non-linear second harmonic conversion scheme (e.g., as described in connection with prior art second harmonic generator of FIG. 1) may benefit from these fluctuations, particularly in the low conversion limit. For example, high-power fluctuations of the fundamental optical beam 11 convert strongly to second harmonic beam 12. The non-linear nature of this coupling implies that an average power conversion is increased more by the high-power fluctuations than the average power conversion is decreased by relatively low-power fluctuations.

In the looped second harmonic generator, second harmonic crystal 24/34 generates second harmonic optical beam 22 based on a combination of fundamental optical beam 21 and residual fundamental optical beam 21A. Here, since residual fundamental optical beam 21A travels a different optical path from fundamental optical beam 21 prior to entering second harmonic crystal 24/34, fluctuations in fundamental optical beam 21 and fluctuations in residual fundamental optical beam 21A may not be synchronized (i.e., may be temporally misaligned) when entering second harmonic crystal 24/34, which prevents enhancement of power conversion from the fluctuations. In other words, second harmonic crystal 24/34 receives fundamental optical beam 21 directly from the laser source, and receives residual fundamental optical beam 21A via the looped optical path. Accordingly, it is possible that fundamental optical beam 21 and residual fundamental optical beam 21A received by second harmonic generator 24/34 may be unsynchronized, which may reduce generation of second harmonic beam 22.

However, as noted above, the fluctuations of the laser source approximately repeat on successive round-trips associated with the laser source. Here, while a gradual change of a waveform of the fluctuations may exist (e.g., on a timescale from tens to hundreds of round-trips), a change in the waveform of the fluctuations from one laser source round-trip (e.g., a first round-trip) to a temporally close round-trip (e.g., a second round-trip, a third round-trip, or a fourth round-trip) is small, which causes the waveforms to be nearly periodic. It follows that the power conversion enhancement may be obtained by designing the delay time of the looped second harmonic generator (e.g., $T_{HG}$) to be approximately equal to, or an approximate integer multiple of, the laser source round-trip time (e.g., $T_{source}$). Here, while fundamental optical beam 21 and residual fundamental optical beam 21A may not be exactly aligned when entering second harmonic crystal 24/34, the fluctuations may be approximately synchronized due to the near-periodic nature of the fluctuation waveform.

In some implementations, the delay time of the looped second harmonic generator may be designed based on a layout of the looped second harmonic generator. For example, one or more components of the looped second harmonic generator (e.g., second harmonic crystal 24/34, polarization filter 25A, polarization filter 25B, frequency filter 26, mirror 27/37, polarization rotator 28, and/or the like) may be arranged such that a delay time resulting from the non-linear optical loop, associated with the components of the looped second harmonic generator, is approximately equal to, or is an approximate integer multiple of, a laser source round-trip time. As a particular example, one or more components of the looped second harmonic generator may be positioned (e.g., glued, soldered, bolted) such that distances between the one or more components cause the non-linear optical loop length to match (i.e., be approximately equal to or be an approximate integer multiple of) the round-trip optical path length of the laser source, thereby causing the delay time of the looped second harmonic generator to be approximately equal to, or an approximate integer multiple of, the laser source round-trip time. In other words, the delay time of the looped second harmonic generator may be designed based on positioning of the one or more components of the looped second harmonic generator.

In some implementations, the delay time design of the looped second harmonic generator may be implemented using a linear build process. The linear build process may include manufacturing the laser source before placing components of the looped second harmonic generator (e.g., within a package that houses the laser source and the looped second harmonic generator). For example, a mode beating period of the laser source may be locked (e.g., throughout life of the laser source) after the laser source is manufactured, while a mode beating period of another laser source (e.g., manufactured at another time) may be different than that of the laser source. In other words, mode beating periods of different laser sources may vary slightly. As such, the round-trip optical path length of the laser source may vary from one laser source to another.

Here, once the laser source is manufactured, the linear build process may further include determining the round-trip optical path length of the laser source, determining a non-linear optical path length that matches the round-trip optical path length of the laser source (e.g., when indices of diffraction of materials of components of the looped second harmonic generator are taken into account), and placing and/or manufacturing components of the looped second harmonic generator such that the non-linear optical path length of the looped second harmonic generator matches the round-trip optical path length of the laser source, thereby causing the delay time of the looped second harmonic generator to be approximately equal to, or an approximate integer multiple of, the laser source round-trip time. In this case, the components of the looped second harmonic generator are fixed in place (e.g., the components may be glued in place, soldered in place, bolted in place, or the like) such that the non-linear optical path and the delay time of the looped second harmonic generator are non-adjustable (i.e., fixed).

Additionally, or alternatively, the delay time design of the looped second harmonic generator may be implemented using an adjustable mechanical component such as a micrometer, a rotary stage, or an adjustable mirror mount that moves one or more optical components within the non-linear optical path, for example a mirror or a prism, thereby allowing the delay time of the non-linear optical path to be adjusted. The inclusion of the adjustable component may allow the non-linear optical path length to be modified after assembly within the package that houses the laser source and the looped second harmonic generator. In such a case, the laser source and the looped second harmonic generator may be assembled within the package before the round-trip optical path length of the laser source is determined. Here, after assembly, the round-trip optical path length of the laser source may be determined, the non-linear optical path length that matches the round-trip optical path length of the laser source may be determined, and the non-linear optical path of the looped second harmonic generator may be adjusted, using the adjustable component, accordingly.

Figure 5:
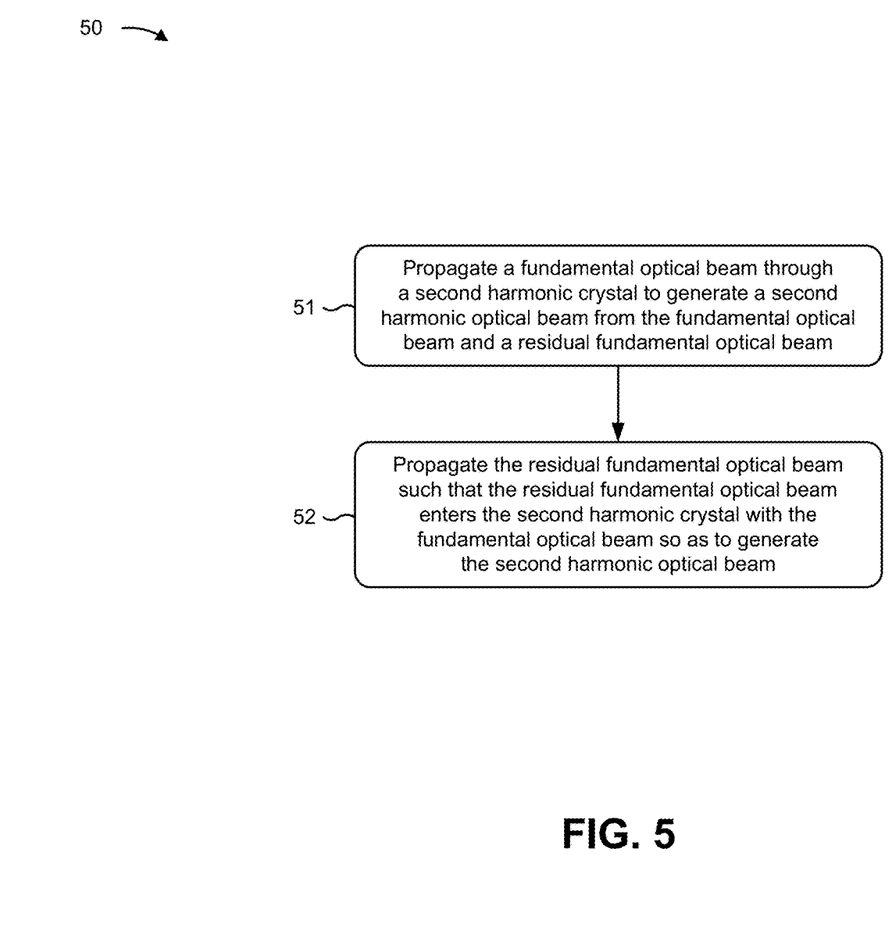
FIG. 5 is a flow chart of an example process for second harmonic optical generation using a looped configuration, as described herein.

FIG. 5 is a flow chart of an example process 50 for second harmonic optical generation using a looped configuration, as described herein. In some implementations, example process 50 may be performed by a looped second harmonic generator, such as second harmonic generator 20, second harmonic generator 30, and/or the like.

As shown in FIG. 5, process 50 may include propagating a fundamental optical beam through a second harmonic crystal to generate a second harmonic optical beam from the fundamental optical beam and a residual fundamental optical beam (block 51). For example, the looped second harmonic generator may propagate a fundamental optical beam through a second harmonic crystal to generate a second harmonic optical beam from the fundamental optical beam and a residual fundamental optical beam, as described above in connection with second harmonic generator 20 and second harmonic generator 30.

In some implementations, upon generation of the second harmonic optical beam, the residual fundamental optical beam may exit the second harmonic crystal, as described above in connection with second harmonic generator 20 and second harmonic generator 30.

As further shown in FIG. 5, process 50 may include propagating the residual fundamental optical beam such that the residual fundamental optical beam enters the second harmonic crystal with the fundamental optical beam so as to generate the second harmonic optical beam (block 52). For example, the looped second harmonic generator may propagate the residual fundamental optical beam such that the residual fundamental optical beam enters the second harmonic crystal with the fundamental optical beam so as to generate the second harmonic optical beam, as described above in connection with second harmonic generator 20 and second harmonic generator 30.

Although FIG. 5 shows example blocks of process 50, in some implementations, process 50 may include additional blocks, fewer blocks, different blocks, or differently arranged blocks than those depicted in FIG. 5. Additionally, or alternatively, two or more of the blocks of process 50 may be performed in parallel.

Some implementations described herein provide a second harmonic generator that uses a looped configuration for second harmonic generation. In some implementations, the looped configuration enables opportunities for a non-linear strength conversion rate to be improved and/or optimized through selection of orientation, polarization orientation, phasematching type, and/or the like. Further, the looped configuration enables opportunities for improving and/or optimizing an output beam quality, an acceptance bandwidth, an angular acceptance, and/or the like, through the use more easily achieved non-critical phasematching (e.g., as compared to the prior art second harmonic generator). Further, the looped configuration for second harmonic generation improves conversion efficiency of the second harmonic generator (e.g., as compared to the prior art second harmonic generator).

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A second harmonic generator, comprising:
    a second harmonic crystal to receive, at a first point in time, a fundamental optical beam and output, at a second point in time, a residual fundamental optical beam; and
    a combiner to combine, at a third point in time, the fundamental optical beam with the residual fundamental optical beam,
        the second harmonic crystal being coupled to the combiner and being further to generate, at a fourth point in time, a second harmonic optical beam from the fundamental optical beam and the residual fundamental optical beam,
            wherein, upon generation of the second harmonic optical beam, the residual fundamental optical beam is to exit the second harmonic generator.

2. The second harmonic generator of claim 1, wherein the fundamental optical beam is in a first polarization and the residual fundamental optical beam is in a second polarization,
    wherein the second polarization is orthogonal to the first polarization, and
    wherein the second harmonic crystal is to perform Type-II phase matching.

3. The second harmonic generator of claim 1, wherein the fundamental optical beam is in a first polarization and the residual fundamental optical beam is in a second polarization,
    wherein the second polarization is orthogonal to the first polarization, and
    wherein the combiner is a polarizing combiner to combine the fundamental optical beam and the residual fundamental optical beam.

4. The second harmonic generator of claim 1, wherein the fundamental optical beam is to be incident on an input optical face of the second harmonic crystal at a first angle, and the residual fundamental optical beam is to be incident on the input optical face of the second harmonic crystal at a second angle,
    wherein the first angle is different from the second angle, and
    wherein the second harmonic crystal is to perform non-collinear phasematching.

5. The second harmonic generator of claim 4, wherein the second harmonic crystal is to perform either Type-I phasematching or Type-II phasematching.

6. The second harmonic generator of claim 4, wherein the second harmonic crystal is to perform non-critical phasematching.

7. The second harmonic generator of claim 1, wherein the fundamental optical beam is to be incident on an input optical face of the second harmonic crystal at a first angle, and the residual fundamental optical beam is to be incident on the input optical face of the second harmonic crystal at a second angle,
wherein the first angle is different from the second angle, and
wherein the combiner is an angular combiner to steer at least the residual fundamental optical beam such that the residual fundamental optical beam is incident on the input optical face of the second harmonic crystal at the second angle.

8. The second harmonic generator of claim 1, wherein the fundamental optical beam, the residual fundamental optical beam, or the second harmonic optical beam is to enter or exit the second harmonic crystal at approximately a Brewster angle.

9. The second harmonic generator of claim 1, wherein a loop round-trip time, associated with the second harmonic generator, is approximately equal to or a multiple of a pulse separation time of a laser source of the fundamental optical beam,
wherein a pulse length, associated with the laser source, is shorter than the loop round-trip time.

10. The second harmonic generator of claim 1, wherein a loop round-trip time, associated with the second harmonic generator, is approximately equal to or a multiple of a laser source round-trip time of a laser source of the fundamental optical beam,
wherein the laser source operates in a multi-longitudinal mode, and
wherein the laser source is a continuous wave laser, or a pulse length, associated with the laser source, is longer than the loop round-trip time.

11. A method, comprising:
propagating, by a second harmonic generator and at a first point in time, a fundamental optical beam through a second harmonic crystal to output, at a second point in time, a residual fundamental optical beam; and
propagating, by a second harmonic generator and at a third point in time, the fundamental optical beam and the residual fundamental optical beam through the second harmonic crystal to generate a second harmonic optical beam from the fundamental optical beam and the residual fundamental optical beam,
wherein, upon generation of the second harmonic optical beam, the residual fundamental optical beam is to exit the second harmonic crystal at a fourth point in time.

12. The method of claim 11, wherein the fundamental optical beam is in a first polarization and the residual fundamental optical beam is in a second polarization,
wherein the second polarization is orthogonal to the first polarization.

13. The method of claim 12, further comprising rotating the residual fundamental optical beam from the first polarization to the second polarization.

14. The method of claim 11, wherein the fundamental optical beam is to be incident on the second harmonic crystal at a first angle, and the residual fundamental optical beam is to be incident on the second harmonic crystal at a second angle,
wherein the first angle is different from the second angle.

15. The method of claim 11, wherein the second harmonic crystal is to perform either Type-I phasematching or Type-II phasematching.

16. The method of claim 11, wherein the second harmonic crystal is to perform non-critical phasematching.

17. The method of claim 11, wherein the fundamental optical beam, the residual fundamental optical beam, or the second harmonic optical beam is to enter or exit the second harmonic crystal at approximately a Brewster angle.

18. The method of claim 11, wherein a surface of the second harmonic crystal is coated with an anti-reflection coating.

19. A laser, comprising:
a second harmonic crystal to receive, at a first point in time, a fundamental optical beam and output, at a second point in time, a residual fundamental optical beam; and
a combiner to combine, at a third point in time, the fundamental optical beam with the residual fundamental optical beam;
the second harmonic crystal to generate, at a fourth point in time, a second harmonic optical beam from the fundamental optical beam and the residual fundamental optical beam,
wherein, upon generation of the second harmonic optical beam, the residual fundamental optical beam is to exit the second harmonic crystal; and
one or more optical components to direct the residual fundamental optical beam to the combiner.

20. The laser of claim 19, wherein the second harmonic crystal is to perform at least one of:
Type-I phasematching;
Type-II phasematching;
non-collinear phasematching; or
non-critical phasematching.

* * * * *